United States Patent [19]

Dimmick

[11] Patent Number: 4,920,442
[45] Date of Patent: Apr. 24, 1990

[54] RELEASABLE SERVO WRITING FIXTURE CONNECTOR

[75] Inventor: Walter S. Dimmick, Atherton, Calif.
[73] Assignee: Quantum Corporation, Milpitas, Calif.
[21] Appl. No.: 242,067
[22] Filed: Sep. 8, 1988
[51] Int. Cl.[5] .............................................. G11B 00/00
[52] U.S. Cl. ................................. 360/137; 360/97.01; 250/201.5; 356/237; 356/363
[58] Field of Search ...................... 360/137, 97.01, 53; 250/201; 356/237, 241

[56] References Cited

U.S. PATENT DOCUMENTS

| | | | |
|---|---|---|---|
| 3,875,589 | 4/1975 | Applequist | 360/78.12 |
| 4,493,554 | 1/1985 | Pryor et al. | 356/241 |
| 4,561,776 | 12/1985 | Pryor | 356/241 X |
| 4,669,073 | 5/1987 | Wakabayashi et al. | 250/201 X |
| 4,766,512 | 8/1988 | Bogdanski | 360/137 |
| 4,789,238 | 12/1988 | Ichikawa et al. | 356/237 |

FOREIGN PATENT DOCUMENTS 62-174638  7/1987  Japan ................................. 356/237

*Primary Examiner*—John H. Wolff
*Attorney, Agent, or Firm*—David B. Harrison

[57] ABSTRACT

Releasable connectors are disclosed for attaching a servo writing fixture to a head transducer assembly to facilitate writing servo information on a servo surface of a rigid disk drive. One connector includes a body for support and attachment of the fixture and an engagement collet for attachment to the top arm of the transducer arm assembly. The engagement collet has a spring operated internal mandrel which disengages the collet from the transducer assembly. Alignment is accomplished with a registration pin that attaches to the top arm of the arm assembly. The second connector includes two parts that are hinge connected in the middle and spring biased apart at the top to form a clamping mechanism. The completed hinged connector defines three leg extensions for attachment to the side of the top arm of the arm assembly and alignment in an opening in the top arm of the arm assembly. Release of the second connector occurs upon compression of the spring. The invention finds special application for attaching and aligning a laser beam retroreflector to the arm assembly to be used in conjunction with a laser interferometer to accomplish servo writing operations on a plurality of disks. The invention is adaptable for use with robotics.

18 Claims, 4 Drawing Sheets

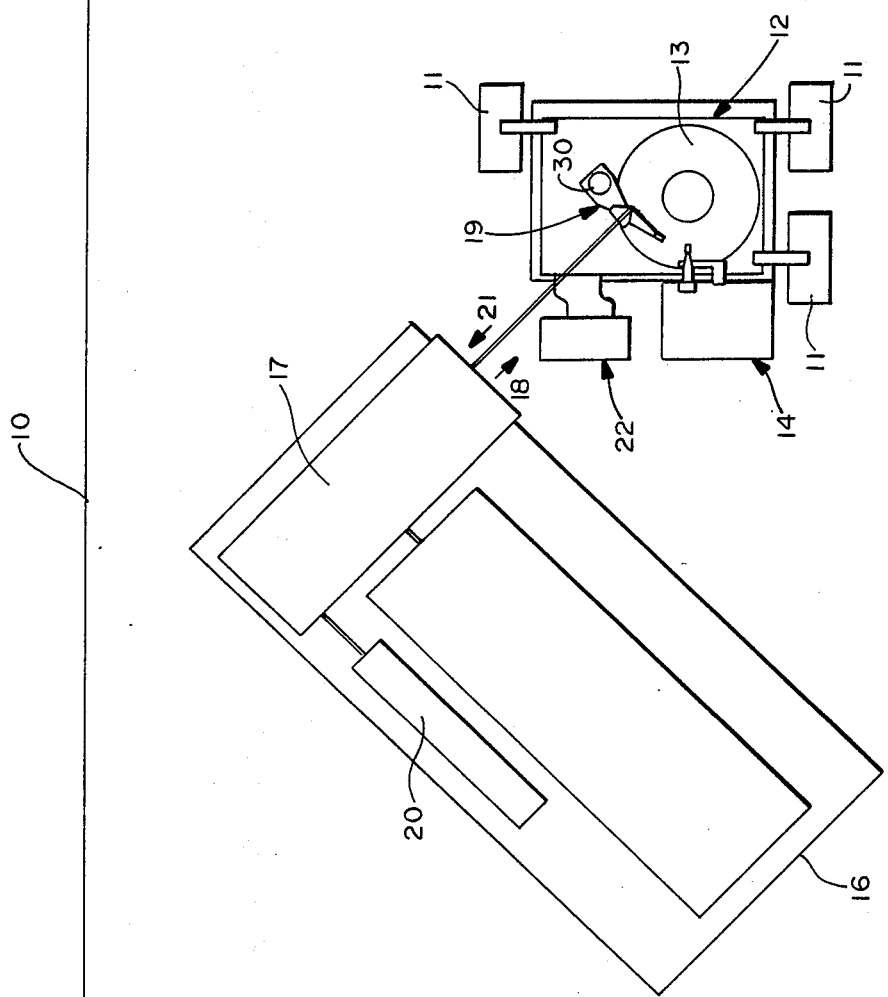

RELEASABLE SERVO WRITING FIXTURE CONNECTOR

FIELD OF THE INVENTION

The present invention relates to a releasable apparatus for temporarily attaching a servo writing fixture to a head transducer assembly to facilitate writing servo information on a servo surface of a rigid disk drive. The invention finds special application for attachment of a retroreflector to the arm assembly, to be used in conjunction with a distance measuring laser interferometer, to accomplish the servo writing operation on a plurality of disks.

BACKGROUND OF THE INVENTION

Servo writing operations employing arm assemblies and laser interferometers are known in the art. The writing operation is accomplished by laser positioning of the servo transducer head with the servo data surface to define precise servo tracks. Precise alignment during the servo track writing operation is mandatory.

Prior attempts to accomplish precise alignment have included the use of granite blocks as a base for servo writing equipment to establish rigidity and freedom from vibrational perturbations. Clipping devices have been employed to attach the servo writing devices to the arm assemblies. Detent mechanisms have also been used to provide continuous alignment throughout the servo writing operation.

The use of granite blocks as a base for servo writing equipment provides some mechanical rigidity; however, complete rigidity has not been realized and precise alignment is not accomplished merely by use of granite blocks bases for servo writers.

Prior clipping devices for removably clipping tools, such as retroreflectors, onto the servo transducer arm assembly have failed both to provide sufficient mechanical rigidity and positive alignment. Servo writing operations have been expensive because the inadequate clipping devices required constant realignment thereby causing the writing operations to be slow and cumbersome.

Detent mechanisms employed to accomplish alignment were often complex; therefore, they were often expensive to produce and slow to operate. One such detent mechanism, discussed in the Applequist U.S. Pat. No. 3,875,589, for use with disk packs, is believed by applicant to be unsuitable for use with robotics because of its complexity.

Another method for alignment discussed in the present assignee's Moon U.S. Pat. No. 4,669,004, used a step motor to rotate a lead screw that clamped onto a lever with a pin that physically engaged the arm assembly. The lead screw follower method failed to provide alignment as precise as that achieved by the use of the laser interferometer with the result that fewer servo sectors and data tracks were written on a given data storage surface.

As can be seen from the above summary of the prior art, an unsolved need exists for rapid, low cost, positive alignment coupled with mechanical rigidity for servo writing devices attached to servo transducer heads for writing operations on a rigid disk drive with a plurality of disks.

SUMMARY OF THE INVENTION WITH OBJECTS

A general object of the invention is to provide a relatively low cost and extremely rigid, compact and releasable apparatus for temporarily attaching a servo writing fixture to a head transducer arm assembly of a high capacity fixed disk drive during the servo writing process.

A specific object of the present invention, is to provide ready, releasable attachment of a retroreflector to the head transducer arm assembly for a plurality of disks to be used in conjunction with a laser interferometer for servo writing operations on a servo surface in a fixed disk drive.

One further object of the present invention is to provide improved mechanical rigidity and positive alignment for servo writing fixtures that are to be attached to arm assemblies and used to write upon multiple disks in a rigid disk drive.

In accordance with the present invention, the servo writing equipment is mounted om stable, granite bases. In one aspect, all rigidity and positive alignment features of the releasable connector are combined in a body which contains a housing for holding the servo writing device to be attached, such as a laser beam prismatic retroreflector, and at least two members located in apertures that extend vertically through the top surface of the body. The first of the members extends downwardly and includes a releasable engagement collet mechanism for temporary attachment of the body to the arm assembly of the rigid disk drive. The second of the downwardly extending members provides an additional point of attachment to the disk drive arm assembly and is further used in alignment procedures when the engagement collet mechanism is firmly attached to the arm assembly of the rigid disk drive.

In another aspect of the present invention, all rigidity and positive alignment features of the releasable connector are combined in a clamping mechanism for attachment to a servo writing device. The clamping mechanism is secured to the arm assembly by at least three points of attachment and is readily released by compression of a bias spring element.

These and other objects, features, aspects and advantages of the present invention will be more fully apparent to those skilled in the art upon consideration of the following detailed description of the preferred embodiments, presented in conjunction with the accompanying drawings.

DESCRIPTION OF THE DRAWINGS

In the drawings:

FIG. 1 depicts a top plan view of a laser-facilitated, disk drive servo writing system of the prior art employing a granite block base to provide mechanical rigidity.

DESCRIPTION OF THE PREFERRED EMBODIMENT

Figure 5:
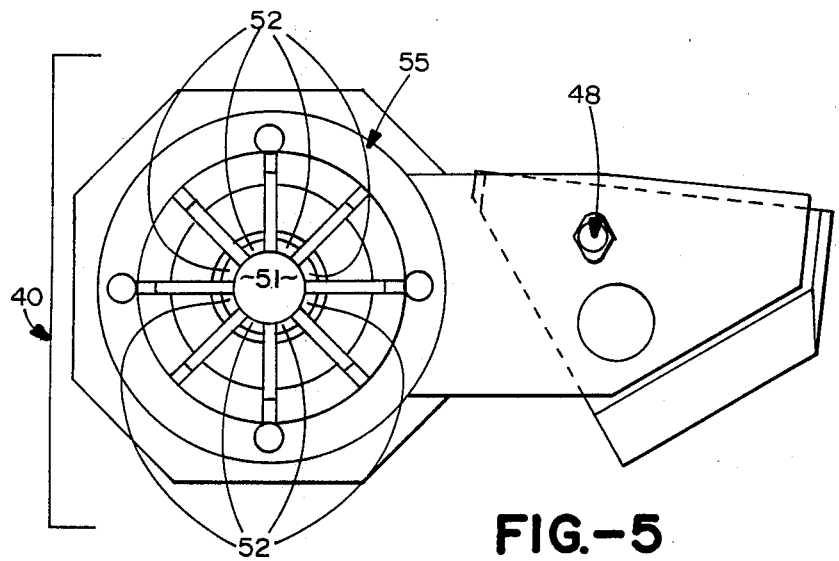
FIG. 5 is a bottom plan view of the FIG. 2 fixture by itself.

Referring to the drawings, the servo writing system is positioned on a granite block baseplate 10 as generally shown in FIG. 1. Three clamps 11 are provided to secure a Winchester fixed disk drive head and disk assembly 12 to the block for the purpose of writing precisely positioned servo information on one or more of the disks 13 of the drive 12. A clock head structure 14 containing a clock head and timing devices is mounted on the block 10 to one side of the disk drive assembly 12 and is positioned relative to the drive 12 by a motorized slide. A connector 22 provides power and control connections to a spindle motor for rotating the disks 13 at a predetermined angular velocity and to a rotary actuator powered transducer arm assembly 30.

A laser interferometer module 16 contains an interferometer 17 that reflects the incidence laser beam toward the disk drive 12. The reflected beam, travelling in the direction indicated by arrow 18, strikes a retroreflector 19 which is temporarily mounted by a releasable connector 40 on the transducer arm assembly 30 of the disk drive 12 during servo writing operations. The retroreflector 19 reflects the laser beam 18 in two segments so that it returns to the interferometer along a path 21 which is parallel to and spaced away from the incidence path 18. The distance between the interferometer 17 and the retroreflector 19 provides a very precise measurement of the relative angular position of the transducer arm assembly 30 relative to the block 10.

Figure 2:
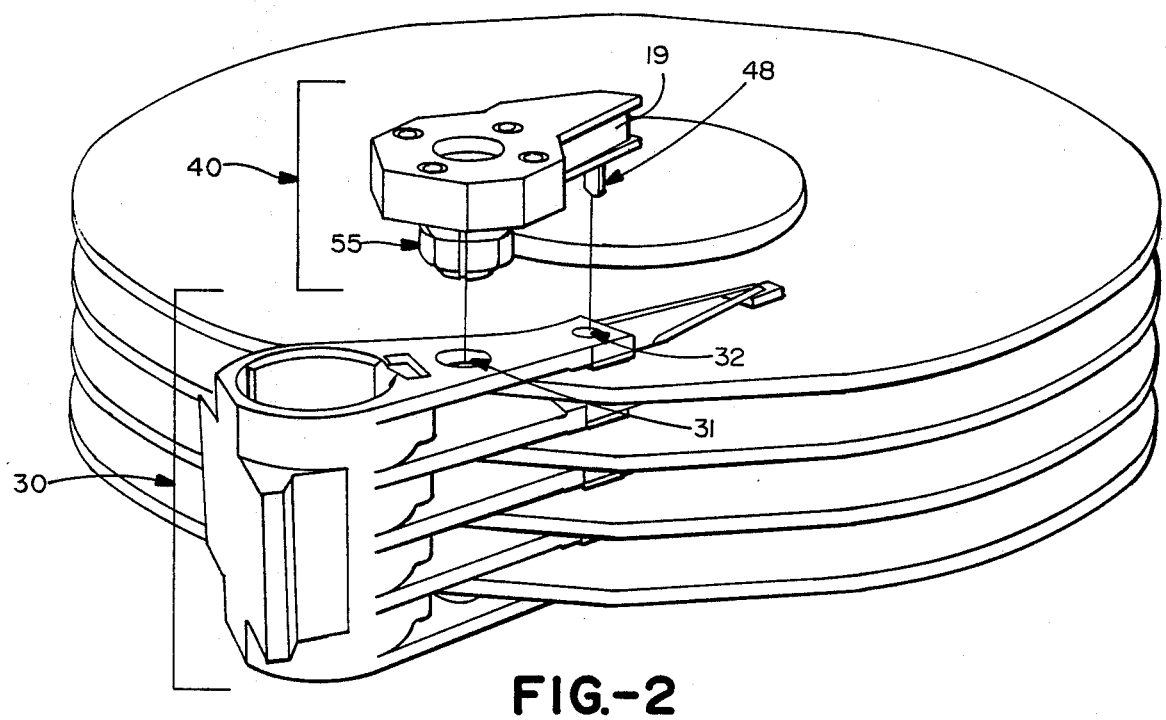
FIG. 2 is an orthogonal, somewhat diagrammatic view of a laser servo retroreflector fixture embodying principles of the present invention positioned above a transducer arm assembly of a disk drive and further depicting the analogous attachment points on the fixture and the arm assembly.

The detection mechanism 20 in the laser interferometer module 16 thus pinpoints the precise position of the arm assembly 30 thereby enabling precision alignment during the servo writing operation. The transducer arm assembly 30 may accommodate any practical number of storage disks. Four disks are shown in FIG. 2, with the top arm of the assembly containing two openings 31 and 32.

A first embodiment 40 of a releasable servo writing fixture for temporary attachment to a head transducer arm assembly 30 of a rigid disk drive is shown in various aspects in FIGS. 2, 3, 4 and 5.

Figure 3:
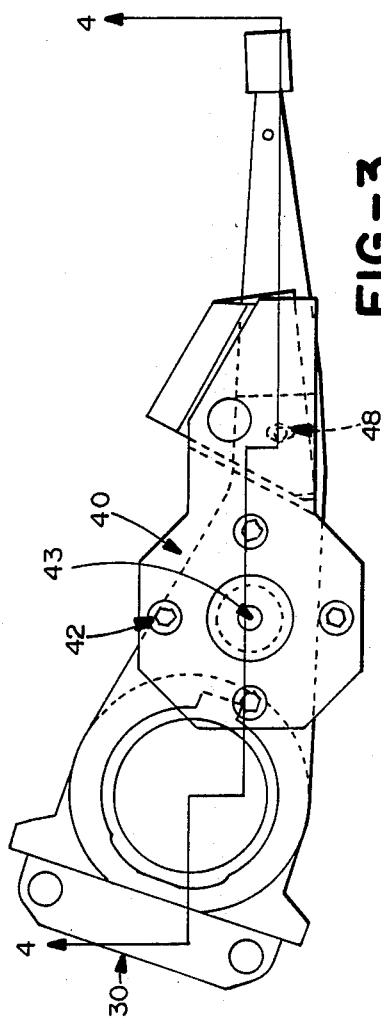
FIG. 3 is a top plan view of the fixture of FIG. 2 attached to the disk drive assembly.
Figure 4:
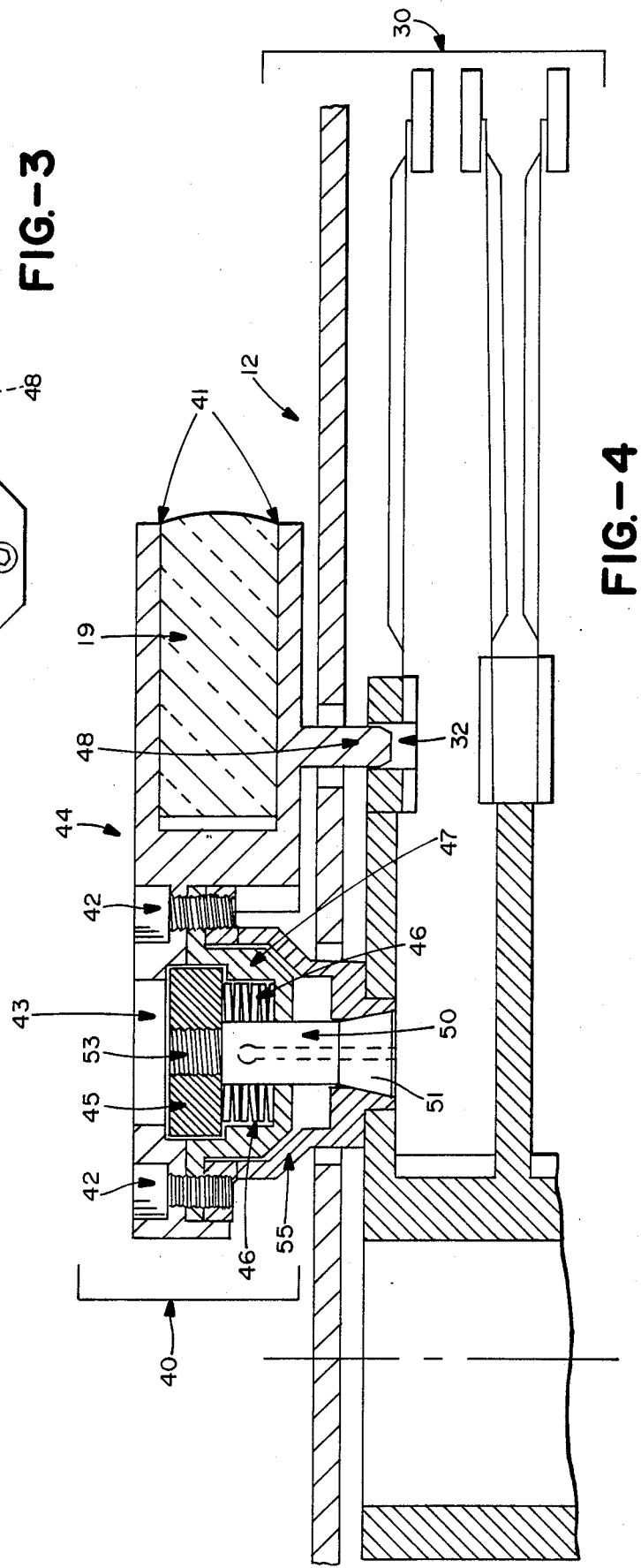
FIG. 4 is a section view in side elevation of the FIG. 2 fixture mounted on the disk drive arm assembly, taken through the line 4—4 of FIG. 3. Some of the structure including bolts and the central mandrel are not sectioned in this view. The slotted disk drive cover is also shown in this view.

Referring to FIG. 3 and FIG. 4, the body 44 of the releasable fixture 40 is shown engaged with the transducer arm assembly 30 in top and side views. The metal body 44 is preferably octagonally shaped at one end as shown in FIGS. 2, 3 and 5. The opposite end of the body defines an opening 41 in which the retroreflector 19 is positioned and attached by a suitable adhesive, as shown in FIG. 4. The top of the body is threaded to receive four vertical screws 42 in four alternating sides of an octagon portion of the body. The body also defines a central aperture 43 in the center of the octagon portion extending vertically through the body.

Referring to FIG. 4, the aperture 43 contains a spring operated nut 45. The nut 45 is threaded to a threaded portion 53 of a cylindrical stem 50 having a frusticonical lower segment 51. The stem 50 and its segment 51 forms a mandrel which enables release and engagement of a collet 55 shown in FIG. 5. Belleville washers 46 are vertically stacked in a washer housing portion 47 of the body. With depression of the nut 45, the resultant compression light of the stacked washers 46 defines the depth of maximum vertical movement of the mandrel 50 within the engagement collet 55. As shown in FIG. 5, the engagement collet 55 is cylindrical, has tapered sides and defines eight downwardly extending teeth 52 for securing the engagement collet to the arm assembly 30 when the nut 45 is not engaged.

FIG. 5 shows a bottom view of the stainless steel engagement collet 55 and the eight teeth 52 formed by the provision of radical slots between adjacent teeth. FIG. 5 also shows a registration pin 48 which provides a second point of attachment of the releasable fixture 40 to the arm assembly 30. Alignment of the retroreflector 19 with the disk drive 12 is accomplished by placement of the registration pin 48 in a top arm opening 32, as better depicted in FIGS. 2 and 4.

In use, a disk drive 12 having its slotted cover in place is positioned and clamped to the base 10 by the clamps 11. The fixture 40 is then grasped by a robotic arm of the servo writer assembly process within a clean area assembly environment. The robotic arm (not shown) includes a member which presses downwardly on the nut 45 and then positions the fixture 40 part way into the opening 31 of the arm assembly 30. Then, the fixture 40 is rotated until the alignment pin 48 is aligned with the opening 32. The fixture 40 is then seated fully in the two openings 31, 43 of the arm assembly 30, and the nut 45 is released. When the nut 45 is released, the stem 50 moves upwardly and its frustoconical lower segment 51 pushes outwardly against the adjacent teeth 52 of the collet 55, thereby locking them against the inside wall of the larger opening 31. The temporary lock thereby achieved rigidly attaches the fixture 40 to the arm assembly 30.

After the servo information is written by one or more of the transducers as positioned by the arm assembly 30 in accordance with laser beam position information reflected back from the retroreflector 19 of the fixture 40, the fixture 40 is removed by robotically grasping the fixture 40 and depressing the nut 45. The fixture 40 may then be freely lifted off of the drive 12, and the drive moved to the next step of the fabrication process.

Figure 6:
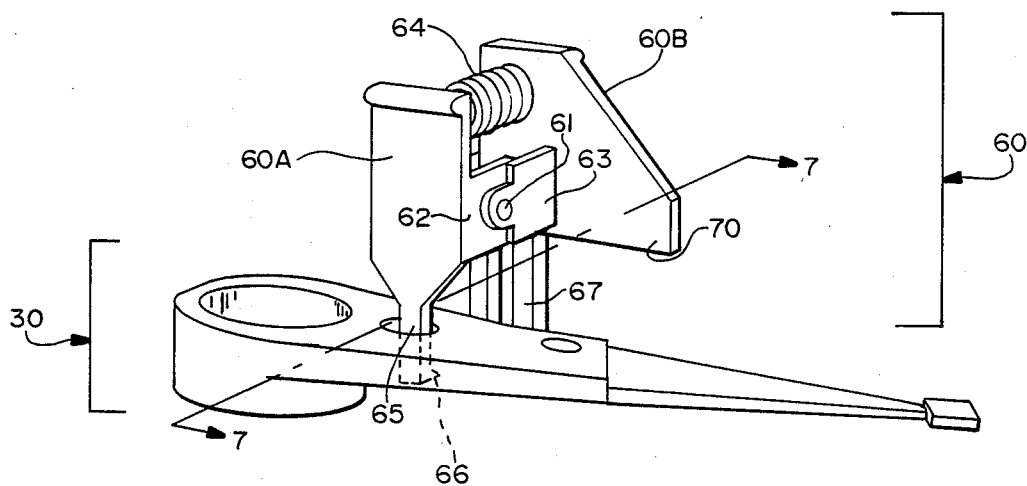
FIG. 6 is a perspective view of a second embodiment of the present invention attached to a transducer arm assembly.
Figure 7:
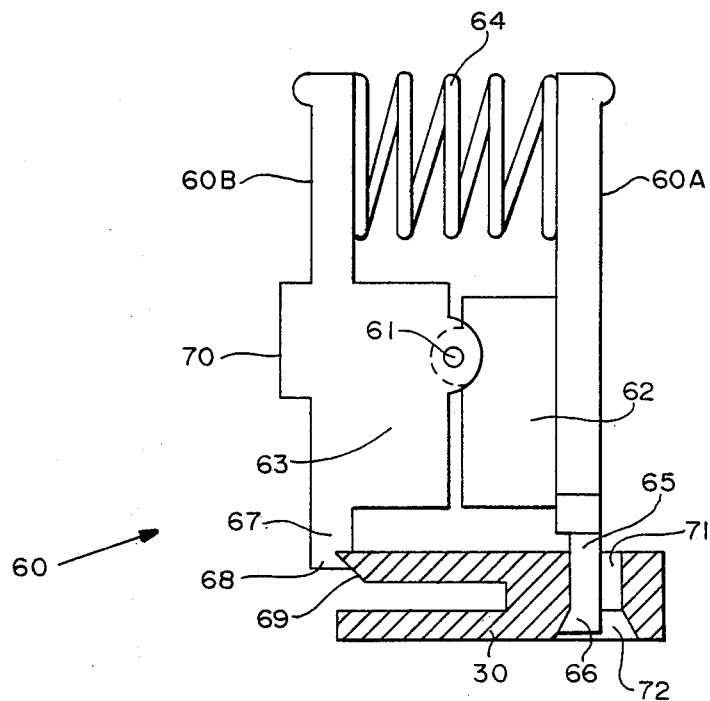
FIG. 7 is a side view in elevation of the second embodiment with the disk drive arm assembly top arm portion in section along the line 7—7 in FIG. 6.

A second embodiment 60 of a releasable fixture of the present invention for temporarily attaching a servo writing fixture to a head transducer arm assembly of a rigid disk drive and incorporating the principles of the present invention is depicted generally in FIGS. 6 and 7. The servo writing system using laser interferometer alignment is positioned and contains the same components as described in the first embodiment 40 of the present invention.

The body of the releasable fixture 60 is constructed of a suitable plastic material, for example; and, it consists of two parts 60A and 60B which are journalled together by a hinge pin 61 that extends through axially aligned openings in inwardly extending arms 62 and 63 on each of the two portions 60A and 60B, respectively. The arm 62 is a central member, and the arm 63 is U-shaped and surrounds the central member 62. A hinge is formed when the arms of the two parts 60A and 60B are connected by the pin 61. The two parts are also biased apart at the top (and together at the bottom) by a bias spring 64. When the top segments of the parts 60A and 60B are pressed together, resultant compression of the spring 64 operates the hinge and releases the connector from the arm assembly 30.

The first part 60A of the releasable connector 60 has a single leg 65 with a foot 66 that attaches through an opening 71 in the top arm of the arm assembly 30 and contacts a part of a countersunk portion 72 at the bottom of the opening 71. The second part of the releasable connector has preferably two legs 67 with notched foot sections 68 that attach to a slanted portion 69 of the side of the top arm assembly 30. The second part 60B also contains a shelf or extrusion 70 to which the laser beam retroreflector 19 is attached. The use of the fixture 60 is similar to the use described for the fixture 40, with the additional advantage that it is manually attachable with ease.

Although two preferred embodiments of the present invention has been disclosed herein, it is contemplated that various modifications of the invention will become apparent to those skilled in the art after having read the foregoing description. For example, stainless steel, plastic materials or other sufficiently rigid materials could be used in the bodies of both embodiments. The first embodiment 40 can be configured other than octagonally and the attachment site for the tool does not have to be an opening. The collet can be operated by other compression devices; and, other compression devices can be used to define maximum vertical movement of the mandrel. The collet can define other than eight teeth. The second embodiment 60 can be formed to provide other than three points of attachment, i.e. the two legs 67 may be a single transverse leg. Accordingly, it is intended that the description not be considered limiting, and that the appended claims be interpreted to cover all alterations and modifications thereof which fall within the true spirit and scope of the invention.

I claim:

1. An apparatus for temporarily attaching a servo writing tool to a head transducer arm assembly of a rigid disk drive, the arm assembly defining a topmost arm having a plurality of attachment locations, comprising:
    a body for supporting the tool in prearranged alignment;
    releasable engagement means for engaging the topmost arm at the attachment locations; and
    registration means for alignment registration of the body.

2. The apparatus set forth in claim 1 wherein the tool is affixed to and supported by the body.

3. The apparatus set forth in claim 2 wherein the servo writing tool is a laser beam retroreflector for reflecting a servo track alignment laser interferometer.

4. The apparatus set forth in claim 1 wherein the attachment locations are openings vertically extending through the topmost arm, and wherein the engagement means is an engagement collet for seating in one of the openings.

5. The apparatus set forth in claim 4 wherein the engagement collet comprises a cylindrical outer portion defining a series of radial teeth and a cylindrical internal collet release member.

6. The apparatus set forth in claim 5 wherein the collet release member is mandrel having a threaded top.

7. The apparatus set forth in claim 6 wherein the mandrel is operated by a spring operated nut.

8. The apparatus set forth in claim 7 wherein the registration means is a pin for seating in the other of the openings.

9. The apparatus set forth in claim 4 wherein the registration means is a pin for seating in the other of the openings.

10. The apparatus set forth in claim 1 wherein the body comprises a first part and a second part hinged to the first part by transverse, centrally disposed hinge pin means; the releasable engagement means comprises downwardly extending, oppositely facing leg portions formed on the parts; releasable bias spring means for biasing the leg portions into engagement contact with the topmost arm; and the registration means comprises structure of the topmost arm adapted to receive and align at least one of the leg portions.

11. The apparatus set forth in claim 10 wherein the tool is affixed to and supported by the body.

12. The apparatus set forth in claim 11 wherein the servo writing tool is a laser beam retroreflector for reflecting a servo track alignment laser interferometer.

13. The apparatus set forth in claim 10 wherein the leg portion of the first part comprises a plurality of legs with notched feet for engagement with a side of the topmost arm of the arm assembly; and wherein the registration means comprises structure on the side adapted to mate with the notched feet.

14. The apparatus set forth in claim 13 wherein the registration means further comprises a single leg with a foot formed on the second part for engagement within an opening formed in the topmost arm of the arm assembly.

15. The apparatus set forth in claim 10 wherein the first part further comprises a shelf for attachment of the retroreflector.

16. An apparatus for temporarily attaching a servo writing tool to a head transducer arm assembly of a rigid disk drive, the arm assembly defining a topmost arm having at least two openings vertically extending therethrough, comprising:
    a body shaped octagonally at one end and having a housing at the opposite end for holding the servo writing tool;
    the octagonal end of the body having an aperture extending vertically through the body;
    the body having a releasable engagement collet within the aperture for engaging a first opening of the topmost arm, the engagement collet being cylindrically shaped and defining eight teeth and containing an internal mandrel with a threaded top;
    a spring operated nut within the first aperture for operation of the engagement collet, the nut engaged with two sets of belleville washers that define the maximum depth of vertical movement of the communicating mandrel;
    the servo writing tool holding end of the body having a registration pin for registration in a second arm assembly opening when the collet is engaged.

17. An apparatus for temporarily attaching a retroreflector to a head transducer arm assembly of a rigid disk drive, the arm assembly defining a topmost arm having sides and at least two openings vertically extending therethrough, comprising:
    a body having a first part and a second part, each part having an arm with an axially aligned perforation therethrough, the arm of the second part defining a U-shape that surrounds the arm of the first part;

a hinge pin for insertion through both arm perforations to connect the first and second parts in a hinge formation;

a spring connected to the first and second parts for biasing the two parts, compression of the spring operating the hinge and releasing the apparatus from the arm assembly;

the first part further having a single leg for attachment within an opening in the top arm of the arm assembly, the single leg aligning the retroreflector and attaching to the arm assembly by a foot;

the second part having two legs with notched feet for attachment to the side of the top arm assembly; and the second part further having an extension for attachment of the retroreflector.

18. The apparatus set forth in claim 17 wherein the bias means biases the leg portions together.

* * * * *